(12) United States Patent
Eungard

(10) Patent No.: US 6,374,554 B1
(45) Date of Patent: Apr. 23, 2002

(54) VEHICLE SHELTER

(75) Inventor: William C. Eungard, Waterford, WI (US)

(73) Assignee: Kelley Company, Inc., Mequon, WI (US)

(*) Notice: Subject to any disclaimer, the term of this patent is extended or adjusted under 35 U.S.C. 154(b) by 0 days.

(21) Appl. No.: 09/532,986

(22) Filed: Mar. 22, 2000

(51) Int. Cl.[7] .............................. E04H 6/00; E04H 9/00
(52) U.S. Cl. ...................... 52/173.2; 52/173.1; 52/2.12; 52/731.3; 52/223.8; 52/481; 52/657; 52/712
(58) Field of Search ....................... 52/173.2, 731.3, 52/223.8, 481, 657, 712

(56) References Cited

U.S. PATENT DOCUMENTS

| | | | | |
|---|---|---|---|---|
| 2,842,725 A | * | 7/1958 | Granberg | 219/105 |
| 3,653,173 A | * | 4/1972 | Frommelt | 52/173 |
| 4,381,631 A | | 5/1983 | Frommelt | |
| 4,494,341 A | | 1/1985 | Schwab | |
| 4,638,612 A | | 1/1987 | Bennett | |
| 4,691,491 A | * | 9/1987 | Lilley | 52/481 |
| 4,695,216 A | | 9/1987 | Erlandsson | |
| 4,711,059 A | | 12/1987 | Layne | |
| 4,760,682 A | * | 8/1988 | King | 52/731 |
| 4,805,362 A | * | 2/1989 | Frommelt | 52/173 |
| 4,825,607 A | * | 5/1989 | Frommelt | 52/173 |
| 5,394,662 A | | 3/1995 | Giuliani et al. | |
| 5,442,885 A | * | 8/1995 | Laven | 52/731.3 |
| 5,473,846 A | | 12/1995 | Giuliani et al. | |
| 5,881,514 A | * | 3/1999 | Pryor | 52/223.8 |
| 5,943,838 A | * | 8/1999 | Madsen | 52/733.2 |
| 6,170,204 B1 | * | 1/2001 | Strobel | 52/173.2 |

OTHER PUBLICATIONS

Kelley loading Dock Seals and Shelters (1994).

* cited by examiner

Primary Examiner—Carl D. Friedman
Assistant Examiner—Christy M. Green
(74) Attorney, Agent, or Firm—Michael Best & Friedrich LLP

(57) ABSTRACT

The present invention provides a flexible frame for a loading dock shelter. The flexible frame utilizes open channels that are clinched together to serve as supports. The supports are used in side frames that form part of the flexible frame. Each side frame includes a back support, a front support, and in a preferred form, one or more lateral supports that are pivotally connected to both the front and back supports. At least one of said supports is formed from open channels which are secured together, preferably by clinching. The back supports of the flexible frame are mounted to a loading dock wall. The pivotal connection between the lateral support and the front and back supports allows the front support to move relative to the back support when a vehicle comes into contact with the side frame as the vehicle enters the loading dock shelter. The present invention also provides an improved method of making a flexible frame for a vehicle shelter and mounting the flexible frame to a loading dock. The method includes the steps of forming (e.g., rolling on a roll-forming machine) sheet metal into channels that have an open cross-section, attaching necessary brackets (e.g., clinching), joining (e.g., clinching) pairs of the channels together to form supports, mounting back supports to a loading dock wall, and pivotally connecting front supports to each of the back supports to form the side frames of a flexible frame.

18 Claims, 5 Drawing Sheets

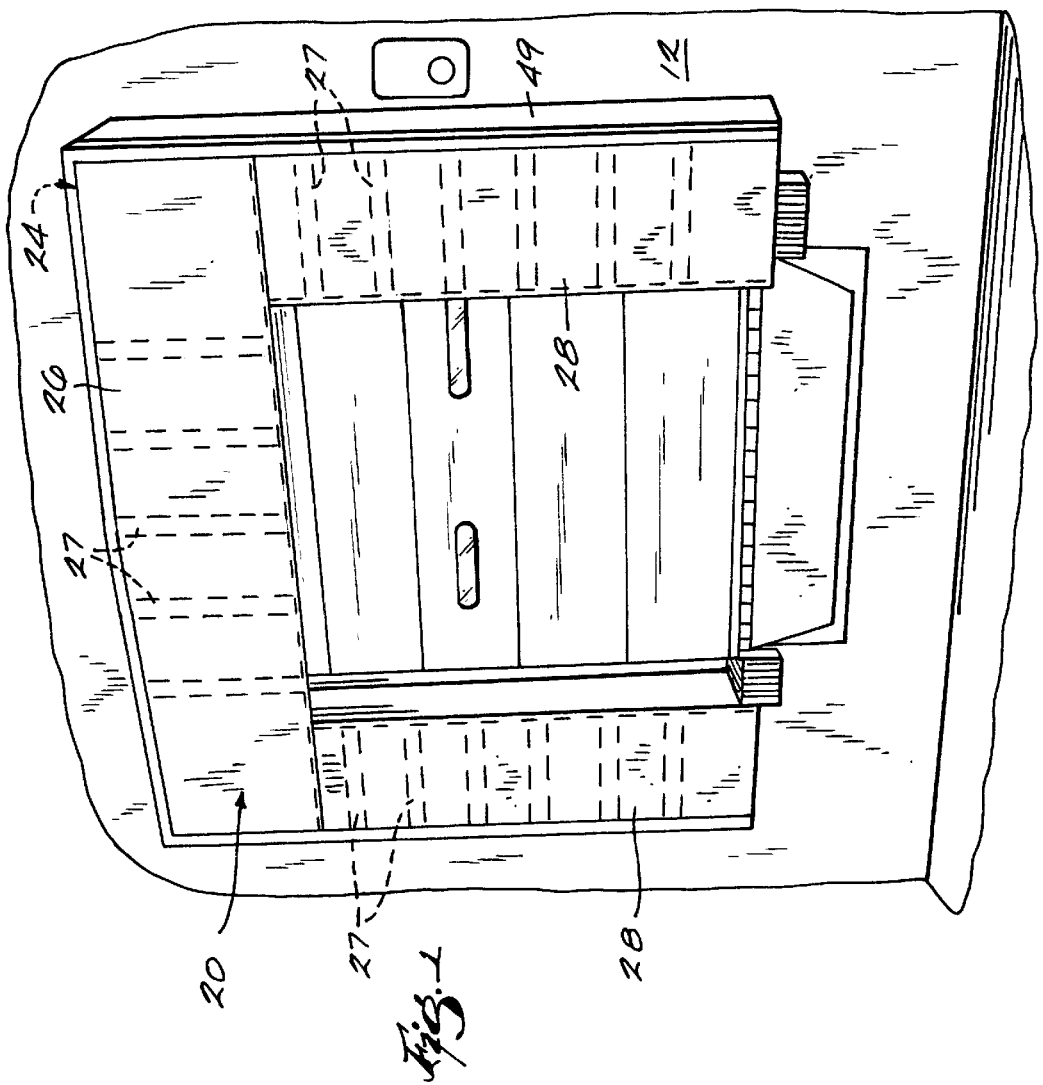

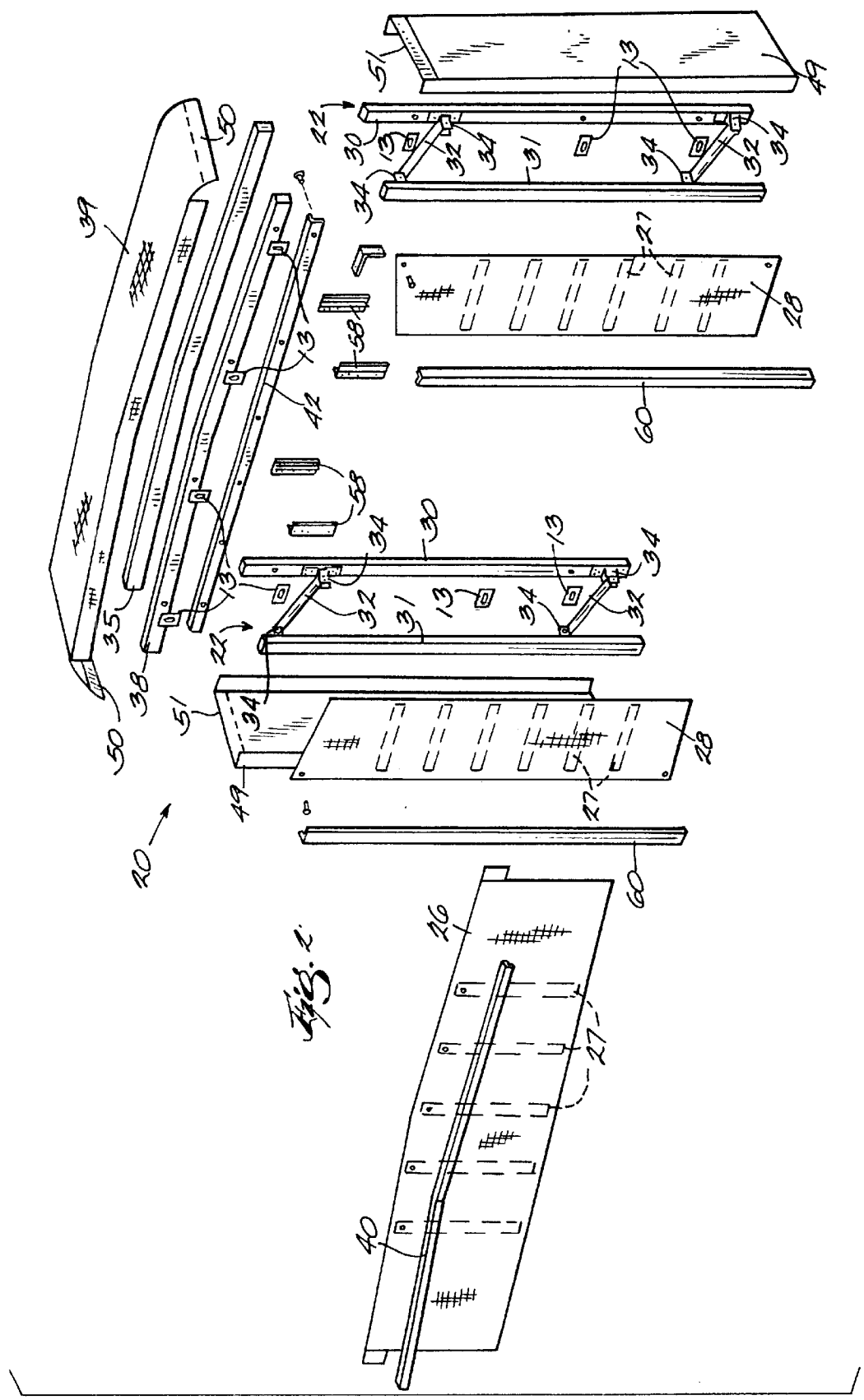

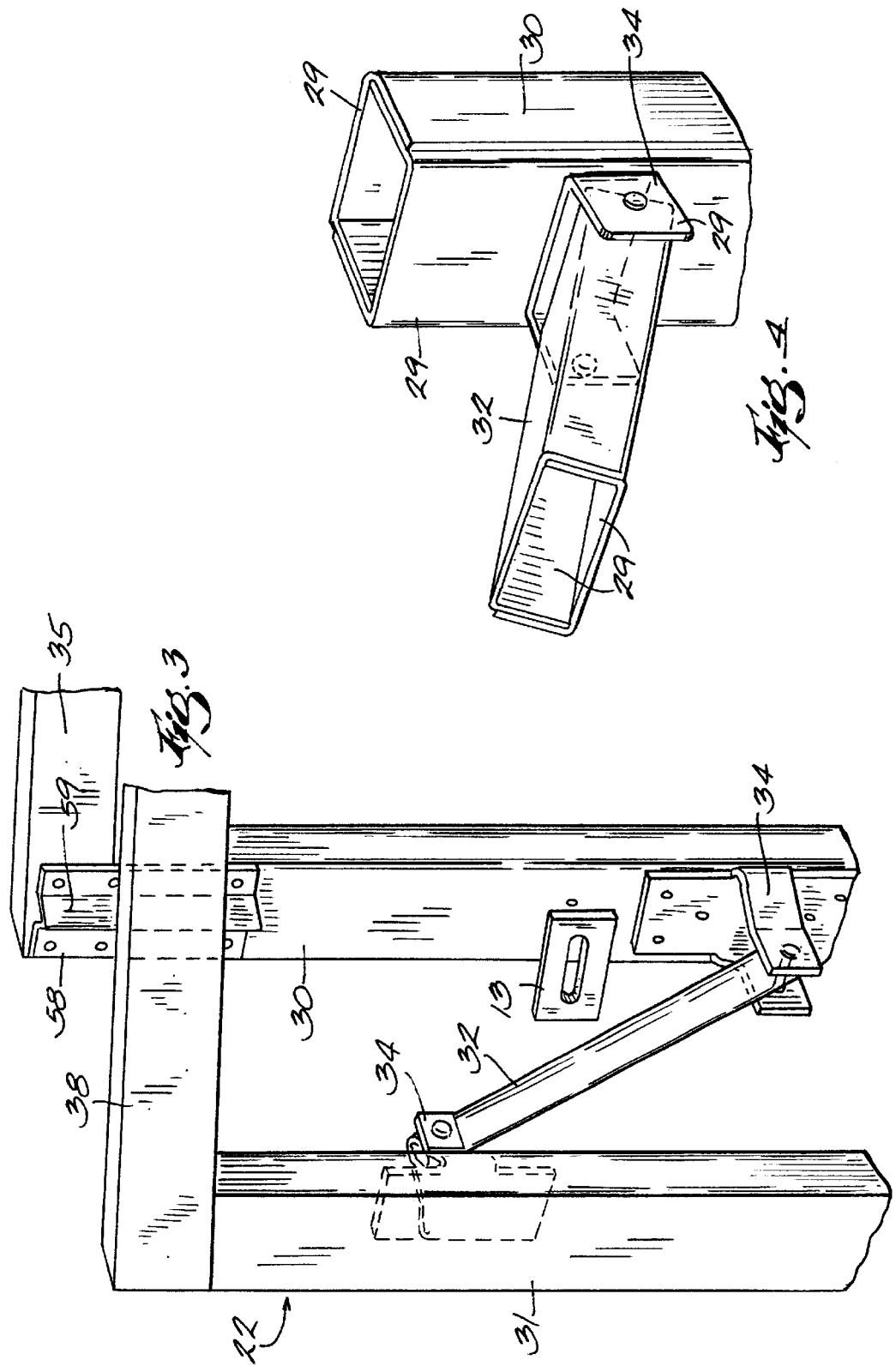

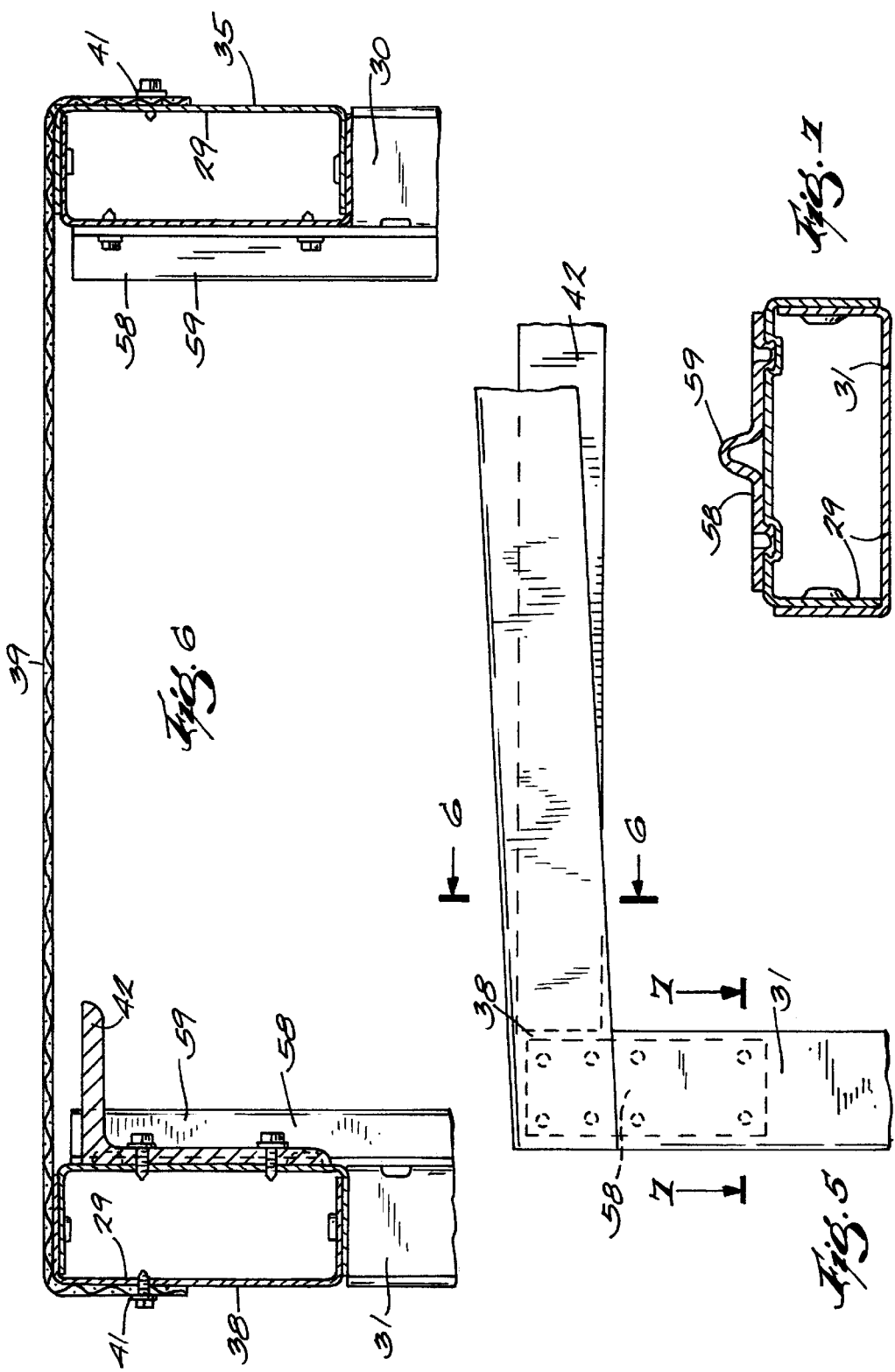

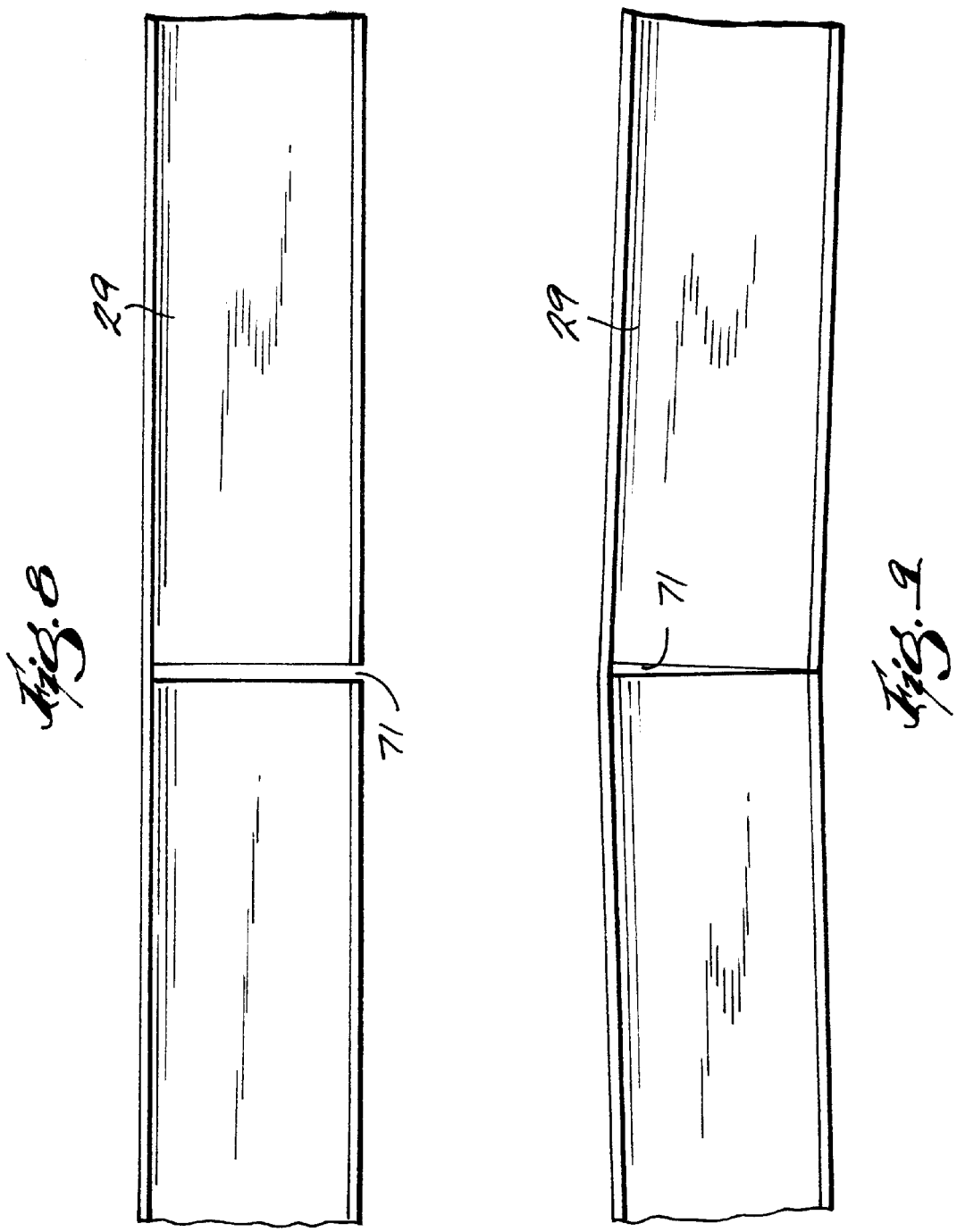

VEHICLE SHELTER

FIELD OF THE INVENTION

The present invention generally relates to the field of loading docks, and more specifically to a vehicle shelter for a loading dock that is positioned around a loading dock opening to provide a weather-tight barrier between the loading dock and the open end of a vehicle (e.g., a truck or trailer).

BACKGROUND OF THE INVENTION

Most warehouses, manufacturing facilities, and large retail stores include loading docks that provide a location for loading and unloading vehicles. Loading docks typically include a raised platform and a dock opening positioned above the raised platform. A dock wall, having two vertical side portions extending upwardly from the platform and a horizontal upper portion connecting the tops of the side portions, forms the dock opening. Vehicles can back toward the dock opening until the back of the vehicle is abutting the platform. The platform sometimes includes a dockleveler that provides a ramp between the platform and the bed of the vehicle to facilitate loading and unloading of the vehicle (e.g., by a forklift).

Many loading docks include dock seals and shelters that provide a barrier between the dock wall and the back of the vehicle. Historically, there have been two types of dock shelters.

The first type of dock shelter includes a rigid frame made of wood or welded steel tubing. The rigid frame is usually made up of a head frame that is positioned above the dock opening and side frames that are positioned on opposing sides of the dock opening. Fiberglass panels or flexible fabric covers the outer sides of the frame in order to establish a weather-tight barrier.

The second type of dock shelter includes a flexible frame, which inhibits damage to the shelter in the event that a vehicle backs into the shelter. The flexible frame typically includes a pair of side frames that are secured to each side of the dock opening. Each side frame includes a back support (e.g., wood or steel tubing) that is mounted to the dock wall. The back support is connected to a front support (e.g., wood or steel tubing) by a lateral support. The lateral support (commonly steel tube) is pivotally connected to both of the front and back supports such that the front support is able to move relative to the back support. Flexible fabric extends between the top ends and outer sides of the front and back supports in order to provide a weather-tight barrier around the outer surface of the vehicle shelter. The fabric is sized to prevent the front support from pivoting (i.e., falling) downward. The fabric is therefore under tension during normal use. When a vehicle backs into the dock shelter off center and impacts one of the side frames, the front support moves upward and toward the back support because the lateral supports pivot with respect to the front and back supports preventing damage to the shelter. After the vehicle moves away from the loading dock, the dock shelter returns to its normal position with the fabric placed under tension.

The front of both flexible and rigid frames commonly includes a head curtain and side curtains with flexible stays mounted therein. The head and side curtains contact the top and sides of the vehicle, respectively, to provide a barrier between the inside of the loading dock and the exterior environment.

The above-described frames and corresponding shelters provide good protection against the elements. However, as with most loading dock equipment, simplified construction techniques and improved structural stability are desirable design goals. In addition, the shelter must withstand repeated uses under a variety of weather and loading conditions.

SUMMARY OF THE INVENTION

The present invention provides a vehicle shelter for a loading dock. The vehicle shelter includes a flexible frame, flexible cover and a curtain. The curtain and flexible cover are each coupled to the flexible frame. The flexible frame includes supports that are made up of pairs of channels that have an open cross-section. The channels are secured together by clinching, screwing, riveting or any well known technique to form supports.

The channels are preferably made from light gauge steel (e.g., 16 GA) which has several advantages over a more conventional heavy gauge rectangular tubing. First, self-drilling screws easily pierce light gauge steel thereby facilitating attachment of curtains and trim angles to the faces of the supports and making it easier to drill mounting holes through the faces of the supports in order to attach the supports to the loading dock wall. Second, using light gauge steel makes the dock shelter easier to assemble because the supports weigh less. Finally, using light gauge steel allows brackets to be clinched to a single channel before two channels are joined together to form a support.

It has also been found that the design of the present invention provides significant advantages over the use of wood in that wood may warp, twist, and split. The present invention is also resistant to rotting and insect damage.

More specifically, the flexible frame of the vehicle shelter includes a pair of side frames. Each side frame includes a back support adapted to be mounted to a loading dock wall, and a front support that is pivotally connected to the back support. The front and back supports are formed from a pair of open channels. In a preferred form, the pairs of channels that form the supports are C-shaped.

In another form, a lateral support extends from the back support to the front support and is pivotally connected to both the front and back supports. The pivotal connection between the lateral support and the front and back supports allows the front support to move relative to the back support when a vehicle comes into contact with the side frame of the shelter as the vehicle enters the loading dock off center.

In another form, the flexible frame further includes a top support coupled to a portion of the front supports in each side frame in order to support a top cover. In this form, a head curtain can be secured to the front face of the top support.

The present invention also provides an improved method of making a vehicle shelter for a loading dock and mounting the vehicle shelter to a loading dock wall. The method comprises the steps of forming (e.g., rolling on a roll-forming machine) sheet metal into channels that have an open cross-section, joining (e.g., clinching) pairs of the channels together to form supports, mounting back supports to a loading dock wall, and pivotally connecting front supports to each of the back supports to form side frames.

In a preferred form of the method, the step of pivotally connecting the front supports to the back supports is done by pivotally connecting a lateral support to both of the front and back supports. The lateral supports may be a steel tube or formed from a pair of C-shaped channels that are clinched together.

BRIEF DESCRIPTION OF THE DRAWINGS

FIG. 1 is a perspective view of a vehicle shelter embodying the present invention mounted onto a loading dock.

FIG. 2 is an exploded view of the vehicle shelter of FIG. 1.

FIG. 3 is an enlarged perspective view illustrating a top portion of one of the side frames used in the vehicle shelter of FIG. 1.

FIG. 4 illustrates an alternative construction for assembling a lateral support to either the front support or the back support of the side frame.

FIG. 5 is a front view illustrating a top portion of the vehicle shelter of FIG. 1 with the curtains and covers removed.

FIG. 6 is a side section view taken along line 6—6 in FIG. 5.

FIG. 7 is a section view take along line 7—7 in FIG. 5.

FIG. 8 is a front view of a channel used in a support before the channel is bent into a raked configuration.

FIG. 9 is a front view of the channel shown in FIG. 8 after the channel has been bent into a raked configuration.

DETAILED DESCRIPTION

Referring to FIGS. 1 and 2, the illustrated vehicle shelter 20 is mounted to a loading dock wall 12. The shelter 20 includes a flexible frame 24 that supports in part a head curtain 26 which hangs pendent from the front of the flexible frame 24, and side curtains 28 extending inwardly from the front of the flexible frame 24. The head curtain 26 and the side curtains 28 include flexible stays 27, as is known in the art. An upper flexible cover 39 extends from the back to the front of the flexible frame 24 in order to establish a weather-tight barrier at the top of the vehicle shelter 20. Similarly, side flexible covers 49 extend from the back to the front of the flexible frame 24 in order to establish a weather-tight barrier at the sides of the vehicle shelter 20.

Referring specifically to FIG. 2, the flexible frame 24 includes side frames 22 that are adapted to be mounted to the loading dock wall 12 (FIG. 1) on opposite sides of a dock opening. Each side frame includes front supports 31, back supports 30, and in some embodiments lateral supports 32. The back supports 30 are connected to the dock wall 12 by extending fasteners (e.g., bolts) through slotted washers 13 (FIGS. 2 and 3). The slotted washers 13 are relatively thick and distribute the bolting force to the double-thickness sides of the supports instead of the thinner center sections.

In the illustrated embodiments, lateral supports 32 are pivotally connected to both the back supports 30 and the front supports 31 such that the front supports 31 can move relative to the back supports 30 when a vehicle comes into contact with the vehicle shelter 20. More specifically, the front supports 31 move upward and toward the back supports 30 as the vehicle moves towards the loading dock wall 12.

The front sections 31 and the back sections 30 of the side frames 22 are formed using channels 29 that have an open cross-section. The channels 29 (see FIGS. 6 and 7) are preferably formed by roll forming and are made from light gauge galvanized steel sheet, although other appropriate materials could be used instead, such as aluminum, fiberglass, plastic, etc. As used herein, a "channel" is an elongated structural member having an open cross section. For example, the cross section could be U-shaped, S-shaped, the illustrated C-shape, or any other open shape. The illustrated C-shape is preferred because it is simple to produce and can be easily joined to other channels. Since the C-shape is preferred, C-shaped channels will be discussed hereafter and are shown in the attached drawings.

The two C-shaped channels are preferably joined to form supports so that the openings in the cross-section face one another. Once the channels are joined, the newly formed support has a boxed, i.e., rectangular, cross section (see FIGS. 6 and 7). The legs of each channel overlap such that two sides in the rectangular cross-section sides have a double thickness. The double thickness on two of the sides in the support provides increased rigidity and resistance. The supports formed from the joined C-shaped channels can be used as the back supports 30, front supports 31 and in some embodiments (see FIG. 4) the lateral supports 32.

Fasteners, such as rivets, screws or bolts can be used to secure the channels together, or the channels can be welded together. However, the preferred technique is to clinch the two pieces together using, for example, a Spot Clinch® clincher sold by Attexor, Inc. of Springfield, Mass. Clinching the pieces together avoids the need to cut through or destroy (e.g., as can occur when using crews, bolts, or welding) the galvanized coating on the sheet metal, thereby enhancing the corrosion resistance of each piece. Alternatively, high strength adhesive, such as cyanoacrylate, could also be used to secure the channels together without harming the galvanized coating.

As shown most clearly in FIG. 3, the lateral support 32 may be steel tube that is pivotally connected to clevis brackets 34. The clevis brackets 34 are, in turn, rigidly connected to the back support 30 and the front support 31 in any conventional manner (e.g., fastening, welding or adhering), although clinching is the preferred manner for connecting the clevis brackets 34 to the supports 30, 31. The two-piece channel configuration of the supports 30, 31 allows the clevis brackets 34 to be clinched to one of channels 29 before the channels 29 are joined together to form the supports 30, 31.

Another form of the lateral support 32 is shown in FIG. 4. In this form, the lateral support 32 is formed from two C-shaped channels 29 that are joined together by clinching. The lateral support 32 is pivotally connected to another type of clevis bracket 34 that is formed from a section of a C-shaped channel 29.

Returning to FIG. 2, the flexible frame includes a first raked support 35 that is adapted to be mounted to the loading dock wall 12, and a second raked support 38 that is secured to the upper ends of the front supports 31. The first raked support 35 and the second raked support 38 are also preferably made from open channels.

The raked supports 35, 38 can be formed by several different techniques. One technique is to cut a slot 71 through the middle of a straight channel 29 (see FIG. 8). The slot 71 is made by cutting through one of the legs and the face of the channel 29. Once the slot 71 is formed in the channel 29, the channel 29 is easily bent into a raked configuration (see FIG. 9). When another channel 29 is raked in the same manner and joined with the first raked channel, they form a raked support.

Alternatively, it has been found that the supports 35, 38 can be bent into the desired raked configuration without the slot. This technique uses a bending fixture similar to a tube bender. If desired, the support could be bent to a large radius so that the support forms an arch, as opposed to the straight-sided raked configuration shown in the drawings.

The illustrated flexible frame 24 includes a straight angle 42 that strengthens the second raked support 38. The straight angle 42 is positioned against and secured to a back surface of the second raked support 38 (see FIG. 6). As shown most clearly in FIG. 5, the straight angle 42 extends between the front supports 31 of the flexible frame 24.

Referring to FIGS. 2 and 6, an upper flexible cover 39 is wrapped over and secured to the front surface of the second raked support 38. The upper flexible cover 39 is preferably secured by using a nail gun to drive nails through a steel slug 41, the upper flexible cover 39, and into the front channel 29 of the second raked support 38. It should be noted that other well known fastening methods could be used without departing from the scope of the present invention.

The upper flexible cover 39 is also wrapped over and secured to the back surface of the first raked support 35 in the same manner as just described for the second raked support 38. Loop fastener 50 is sewn to both inside ends of the upper flexible cover 39. Hook fastener 51 is sewn to the upper outside end of both lateral flexible covers 49. During assembly of the shelter 20, the appropriate loop fasteners 50 are secured to the appropriate hook fasteners 51.

As best shown in FIG. 2, the lateral flexible covers 49 are wrapped around and secured to the front surface of the front supports 31 and secured to the back surface of the back supports 30 by nailing in the same manner as above.

As shown most clearly in FIGS. 2, 3 and 5–7, the upper ends of the front supports 31 and the back supports 30 are secured to the first raked support 35 and the second raked support 38, respectively, by V-brackets 58. The V-brackets 58 are connected in any well-known manner (e.g., by using self-drilling screws) to one end of one of the raked supports 35, 38 and the upper end of one of the supports 30, 31. The two-piece channel 29 construction allows the V-brackets 58 to be clinched to the supports 30, 31 and/or the raked supports 35, 38. As shown most clearly in FIG. 7, the V-brackets 58 preferably include a V-shaped section 59 that provides additional strength and rigidity to each of the V-brackets 58. Although brackets 58 are shown as being V-shaped, the brackets 58 could also have a U-shaped or ribbed cross-section. In addition, the brackets 58 could also be formed from two angles joined together to form a T-shaped cross-section.

During the assembly of the head curtain 26 to the flexible frame, self-drilling screws are inserted through an outer raked trim angle 40 and the head curtain 26 into the second raked support 38. The side curtains 28 are assembled to the side frames 22 by inserting self-drilling screws through an aluminum angle 60 and the side curtains 28 before entering the front support 31. Each self-drilling screw is preferably inserted through one of the stays 27 in the head curtain 26 and the side curtains 28.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A vehicle shelter for a loading dock, said vehicle shelter comprising:

a flexible frame having a pair of side frames, each of said side frames including a back support adapted to be mounted to a loading dock wall and a front support movably coupled to said back support, wherein one of said front support and back support includes a first channel having an open cross-section positioned against a second channel having an open cross-section, wherein said first channel has a width and said second channel has a width, said width of said first channel being substantially equal to said width of said second channel, a curtain mounted to a front portion of said flexible frame, and a flexible cover mounted to an outer surface of said flexible frame.

2. The vehicle shelter as claimed in claim 1 wherein said first channel and said second channel are C-shaped.

3. The vehicle shelter as claimed in claim 1 wherein said first channel and said second channel are joined with open portions of said open cross-sections facing one another.

4. The vehicle shelter as claimed in claim 1 wherein said back support is pivotally coupled to said front support.

5. Th vehicle shelter as claimed in claim 4 wherein each of said side frames includes a lateral support that is pivotally coupled to said front support and pivotally coupled to said back support.

6. The vehicle shelter as claimed in claim 5 further comprising an additional lateral support pivotally coupled to said back support and pivotally coupled to said front support.

7. The vehicle shelter as claimed in claim 1 further comprising a top support connected to said front supports, said top support having a raked configuration and wherein said curtain is coupled to said top support.

8. The vehicle shelter as claimed in claim 7 wherein said curtain is positioned against a front surface of said top support, and said flexible frame further includes a straight angle coupled to a back surface of said top support for supporting said top support.

9. A method of making a vehicle, shelter for a loading dock and mounting the vehicle shelter to a loading dock, said method comprising the steps of:

forming a plurality of channels having open cross-sections and widths, the widths of the plurality of channels being substantially equal;

attaching pairs of the channels together to form a front support and a back support;

mounting the back supports to a loading dock wall; and pivotally coupling the front supports to each of the back supports to form side frames.

10. The method as claimed in claim 9 wherein said forming step includes the step of rolling sheet metal on a roll-forming machine.

11. The method as claimed in claim 9 wherein said attaching step includes clinching the channels together.

12. The method as claimed in claim 9 wherein said step of pivotally connecting the front supports to each of the back supports includes the step of pivotally connecting a lateral support to both of the front and back supports.

13. The method as claimed in claim 9 further comprising the step of securing a top support to a portion of the front supports.

14. The method as claimed in claim 13 further comprising the step of raking the top support into a raked support.

15. The method as claimed in claim 13 further comprising the step of securing a straight angle to a back surface of the top support.

16. The method as claimed in claim 9 further comprising the step of attaching a bracket to one or more of the channels.

17. The method as claimed in claim 16 wherein said step of attaching a bracket to one or more of the channels includes clinching a clevis bracket to one or more of the channels.

18. The method as claimed in claim 16 wherein said step of attaching a bracket to one or more of the channels includes clinching a V-shaped bracket to one or more of the channels.

* * * * *